United States Patent

Talcott et al.

[19]

[11] Patent Number: 5,964,869
[45] Date of Patent: *Oct. 12, 1999

[54] INSTRUCTION FETCH MECHANISM WITH SIMULTANEOUS PREDICTION OF CONTROL-FLOW INSTRUCTIONS

[75] Inventors: Adam R. Talcott; Ramesh K. Panwar, both of Santa Clara, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,753

[22] Filed: Jun. 19, 1997

[51] Int. Cl.$^6$ ........................................ G06F 9/38
[52] U.S. Cl. ............................. 712/236; 712/240
[58] Field of Search ...................... 395/583, 587, 395/585, 586; 712/236, 238, 239, 240

[56] References Cited

U.S. PATENT DOCUMENTS

| | | | |
|---|---|---|---|
| 4,777,587 | 10/1988 | Case et al. ............................. | 395/582 |
| 5,101,341 | 3/1992 | Circello et al. . | |
| 5,142,634 | 8/1992 | Fite et al. . | |
| 5,283,873 | 2/1994 | Steely, Jr. et al. . | |
| 5,394,529 | 2/1995 | Brown, III et al. ..................... | 395/587 |
| 5,394,530 | 2/1995 | Kitta ........................................ | 395/587 |
| 5,440,717 | 8/1995 | Bosshart . | |
| 5,454,117 | 9/1995 | Puziol et al. . | |
| 5,461,722 | 10/1995 | Goto ....................................... | 395/582 |
| 5,553,255 | 9/1996 | Jain et al. . | |
| 5,592,634 | 1/1997 | Circello et al. ......................... | 395/586 |
| 5,604,909 | 2/1997 | Joshi et al. .............................. | 395/384 |
| 5,613,081 | 3/1997 | Black et al. ............................. | 711/3 |
| 5,623,614 | 4/1997 | Van Dyke et al. . | |
| 5,708,788 | 1/1998 | Katsuno et al. . | |
| 5,732,253 | 3/1998 | McMahan . | |

OTHER PUBLICATIONS

Yeh. et al., "Branch History Table Indexing to Prevent Pipeline Bubbles in Wide–Issue Supersealar Processors", *Proceedings of the 26th Annual International Symposium on Microarchitecture*, 1993, pp. 164–175, IEEE, Dec. 1–3, 1993.

Yeh, et al, "A Comprehensive Instruction Fetch Mechanism for a Processor Supporting Speculative Execution," Department of Electrical Engineering and Computer Science, University of Michigan, IEEE Publication 1992, pp. 129–139.

*Primary Examiner*—Wiiliam M. Treat
*Attorney, Agent, or Firm*—Conley, Rose & Tayon, PC; B. Noel Kivlin

[57] ABSTRACT

A microprocessor is provided with an instruction fetch mechanism that simultaneously predicts multiple control-flow instructions. The instruction fetch unit further is capable of handling multiple types of control-flow instructions. The instruction fetch unit uses predecode data and branch prediction data to select the next instruction fetch bundle address. If a branch misprediction is detected, a corrected branch target address is selected as the next fetch bundle address. If no branch misprediction occurs and the current fetch bundle includes a taken control-flow instruction, then the next fetch bundle address is selected based on the type of control-flow instruction detected. If the first taken control-flow instruction is a return instruction, a return address from the return address stack is selected as the next fetch bundle address. If the first taken control-flow instruction is an unconditional branch or predicted taken conditional branch, a predicted branch target address is selected as the next fetch bundle address. If no branch misprediction is detected and the current fetch bundle does not include a taking control-flow instruction, then a sequential address is selected as the next fetch bundle address.

18 Claims, 5 Drawing Sheets

INSTRUCTION FETCH MECHANISM WITH SIMULTANEOUS PREDICTION OF CONTROL-FLOW INSTRUCTIONS

BACKGROUND OF THE INVENTION

1. Field of the Invention

This invention relates to the field of microprocessors and, more particularly, to instruction fetching within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly. A pipeline stage is assigned to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth due to the number of instructions executed concurrently and due to the increasing clock frequency (i.e. shortening clock cycle) employed by the superscalar microprocessors. Many of the instructions include memory operations to fetch (read) and update (write) memory operands in addition to the operation defined for the instruction. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to relieve the bandwidth requirements on the main memory system, microprocessors typically employ one or more caches to store the most recently accessed data and instructions. Caches perform well when the microprocessor is executing programs which exhibit locality of reference, i.e., access data that has been recently accessed (temporal locality) or access data that is located near data that has been recently accessed (spatial locality). A memory access pattern exhibits locality of reference if a memory operation to a particular byte of main memory indicates that memory operations to other bytes located within the main memory at addresses near the address of the particular byte are likely. Generally, a "memory access pattern" is a set of consecutive memory operations performed in response to a program or a code sequence within a program. The addresses of the memory operations within the memory access pattern may have a relationship to each other. For example, the memory access pattern may or may not exhibit locality of reference.

When programs exhibit locality of reference, cache hit rates (i.e. the percentage of memory operations for which the requested byte or bytes are found within the caches) are high and the bandwidth required from the main memory is correspondingly reduced. When a memory operation misses in the cache, the cache line (i.e. a block of contiguous data bytes) including the accessed data is fetched from main memory and stored into the cache. A different cache line may be discarded from the cache to make room for the newly fetched cache line.

Instruction fetch units fetch blocks of instructions from an instruction cache for decoding and execution. The performance of a microprocessor is dependent upon keeping the instruction processing pipeline filled with the instructions of a program. Accordingly, the instruction fetch unit must predict the order of instruction within a program. Instructions of a program are typically executed sequentially. Control-flow instructions, however, cause instructions to be executed in a nonsequential order. For example, a branch instruction may cause program execution to jump to a nonsequential instruction address. In a pipelined microprocessor, a conditional control-flow instruction, such as a conditional branch instruction, may not be resolved at the time instructions are fetched from the instruction cache. Waiting for the branch instruction to be resolved would starve the pipeline and severely impact performance. In order to maintain optimum performance of the microprocessor, it is necessary to predict the instruction subsequent in program order to the control-flow instruction and dispatch that instruction into the instruction processing pipeline. Accordingly, the outcome and/or target address of a control-flow instruction must be predicted at the time of instruction fetching. For example, when a conditional branch is encountered, a prediction is made whether the branch instruction will be "taken" or "not taken." If the branch instruction is predicted "not taken," instructions sequential in program order to the branch instruction are fetched and conveyed into the instruction processing pipeline. If, however, the branch instruction is predicted "taken," the target address of the branch instruction is predicted and instructions at the target address are fetched and dispatched in the instruction processing pipeline. If the control-flow predictions are correct, the instruction processing pipeline is filled with instructions in the correct program order. If the control-flow predictions are incorrect, instructions within the instruction processing pipeline do not represent instructions in the program order. Those instructions must be flushed from the instruction pipeline and the correct instructions fetched and dispatched.

Correct prediction of control-flow instructions may be critical to the performance of a microprocessor. Changes in control-flow account for at least 15 to 20 percent of the instructions executed in a typical program sequence. As noted above, superscalar microprocessors execute multiple instructions per clock cycle. Accordingly, superscalar microprocessors fetch multiple instructions per clock cycle from the instruction cache to keep the instruction processing pipeline full. As parallelism increases, i.e., more instructions are executed per clock cycle, the probability of encountering multiple control-flow instructions per fetch cycle is increased. Unfortunately, instruction fetch units typically cannot detect and predict multiple control-flow instructions per clock cycle. Further, instruction fetch units typically cannot detect and predict multiple types of control-flow instructions per clock cycle. For example, a block of instructions may include a conditional branch instruction followed by a return instruction. If the conditional branch instruction is predicted "not taken," the instruction fetch unit typically is not capable of predicting the target address of the return instruction. Accordingly, instruction dispatch is typically stalled until a subsequent cycle, which may severely limit microprocessor performance.

SUMMARY OF THE INVENTION

The problems outlined above are in large part solved by a microprocessor in accordance with the present invention. In one embodiment, a microprocessor includes an instruction fetch unit with simultaneous prediction of multiple control-flow instructions. The instruction fetch unit fetches a group of N instructions, called the current fetch bundle, each instruction fetch cycle. For the purposes of this disclosure, an "instruction fetch cycle" refers to a clock cycle or cycles in which instructions are fetched from cache or memory for dispatch into the instruction processing pipeline. The current fetch bundle includes the instruction located at a current fetch bundle address and the N−1 subsequent instructions in sequential order. For each current fetch bundle, the instruction fetch unit generates one or more predicted branch target addresses, a sequential address, a return address, and, if a misprediction is detected, a corrected branch target address. Based upon the detection of a branch misprediction and/or the occurrence of control-flow instructions within the current fetch bundle, branch logic selects one of the above addresses as the next fetch bundle address.

If a branch misprediction is detected, the corrected branch target address is selected as the next fetch bundle address. If no branch misprediction is detected, the control-flow instructions with the current fetch bundle are identified. If the first "taken" control-flow instruction is a return from a call instruction, the return address is selected as the next fetch bundle address. For the purposes of the disclosure, a "taken control-flow instruction" may be an unconditional control-flow instruction, such as a unconditional branch or return instruction, or a conditional branch instruction that is predicted "taken". If the first control-flow instruction is an unconditional branch, one of the predicted branch target addresses is selected as the next fetch bundle address. If the first control-flow instruction is a conditional branch instruction that is predicted taken, one of the predicted branch addresses is selected as the next fetch bundle address. If no "taken control-flow instructions" are within a fetch bundle, the sequential address is selected as the next fetch bundle address. The sequential address is the address of the fetch bundle that is numerically sequential to the current fetch bundle. If a fetch bundle includes eight instructions, the sequential address is the current fetch bundle address plus the number of addresses occupied by the eight instructions. For example, if instructions are byte addressable and each instruction is thirty-two bits, the sequential address is the current fetch bundle address plus thirty-two.

Multiple predicted branch target addresses may be derived per fetch bundle. Accordingly, different control-flow instructions within a fetch bundle may have different predicted branch target addresses. An instruction fetch mechanism in accordance with the present invention advantageously permits the simultaneous prediction of multiple control-flow instructions, including multiple types of control-flow instructions, each instruction fetch cycle.

Generally speaking, the present invention contemplates an instruction fetch unit that concurrently makes multiple predictions for different types of control-flow instructions including a branch address table, a sequential address circuit, an unresolved branch circuit, a multiplexer and a branch logic circuit. The branch address table is configured to store predicted branch target addresses for branch instructions and to output a predicted branch target address signal. The sequential address circuit is configured to calculate a sequential address and to output a sequential fetch address signal. The unresolved branch circuit is configured to store a corrected branch target address for a mispredicted branch instruction and to output a corrected branch target address signal. The multiplexer is coupled to receive a plurality of input signals including the predicted branch target address signal, the sequential fetch address signal and the corrected branch target address signal, and configured to output a current fetch bundle address signal that addresses a fetch bundle. The branch logic circuit is coupled to a control signal of the multiplexer. The branch logic circuit is configured to cause the multiplexer to select one of the plurality of input signals in dependence on an occurrence of a control-flow instruction within the fetch bundle or an occurrence of a mispredicted branch instruction.

The present invention further contemplates a method for concurrently making multiple predictions of different types of control-flow instructions including: generating a sequential fetch address, wherein the sequential fetch address is an address of a fetch bundle sequential in numerical order to a current fetch bundle; generating a predicted branch target address; generating a corrected branch target address, wherein the corrected branch target address is the correct target address of mispredicted branch instruction; detecting a branch misprediction, wherein if a branch misprediction is detected, the corrected branch target address is selected as a next fetch bundle address; and detecting a first taken control-flow instruction. If the first taken control-flow instruction is an unconditional branch instruction, the predicted branch target address is selected as the next fetch bundle address. If the first taken control-flow instruction is a taken conditional branch instruction, the predicted branch target address is selected as the next fetch bundle address. If neither a branch misprediction or a taken control-flow instruction is detected, the sequential fetch address is selected as the next fetch bundle address. A next fetch bundle is retrieved using the next fetch bundle address.

BRIEF DESCRIPTION OF THE DRAWINGS

Other objects and advantages of the invention become apparent upon reading the following detailed description and upon reference to the accompanying drawings in which.

Figure 1:
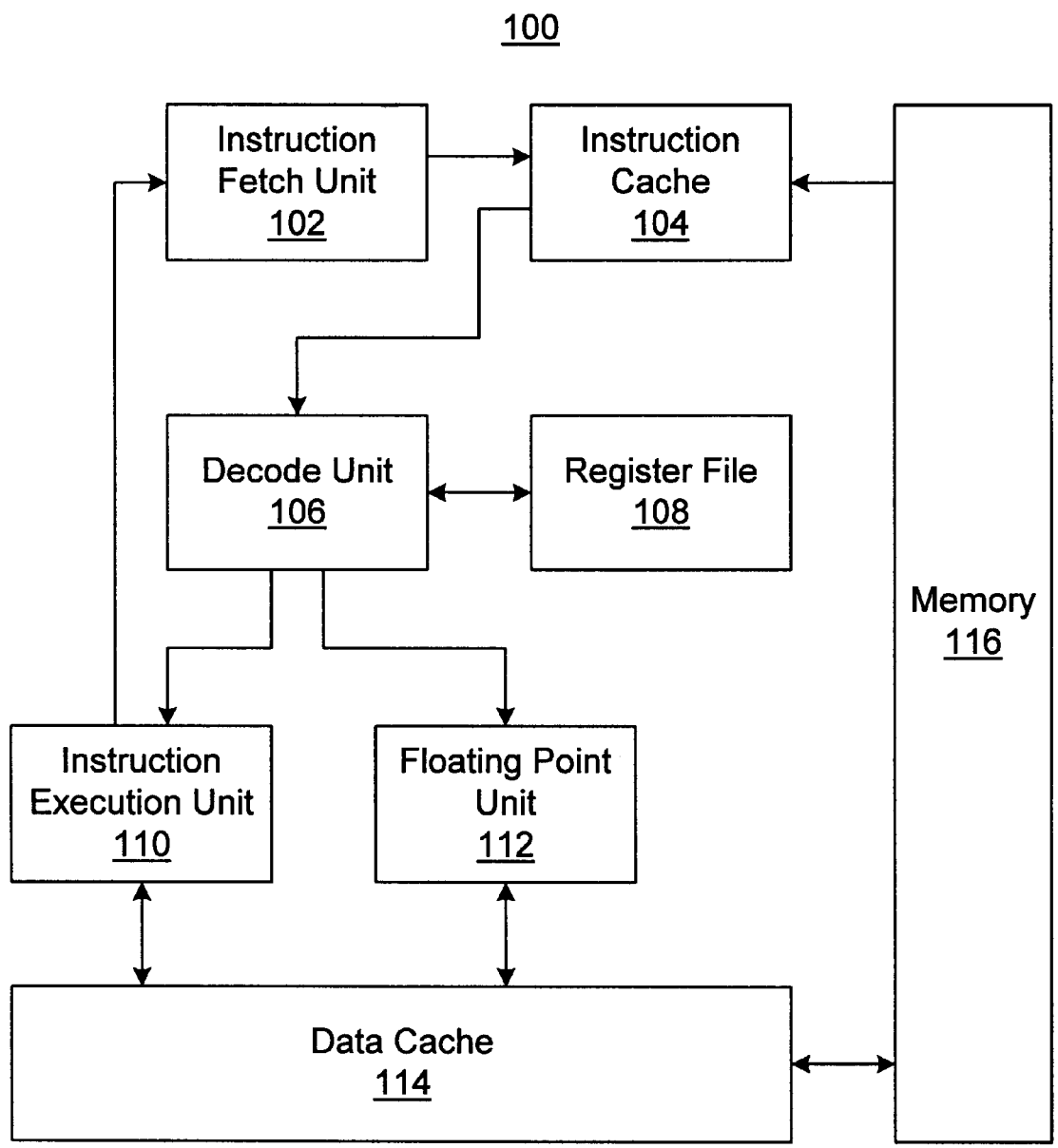
FIG. 1 is a block diagram of one embodiment of a microprocessor in accordance with one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 100 is shown. Microprocessor 100 includes instruction fetch unit 102, an instruction cache 104, a decode unit 106, a register file 108, an instruction execution unit 110, a floating point unit 112, a data cache 114, and a memory 116. Instruction execution unit 110 and floating point unit 112 may include a plurality of execution units and floating point units, respectively.

As shown in FIG. 1, instruction cache 104 is coupled to memory 116, instruction fetch unit 102 and decode unit 106. Instruction fetch unit 102 is further coupled to instruction execution unit 110. Decode unit 106 is coupled to instruction execution unit 110, floating point unit 112 and register file 108. Data cache 114 is coupled to instruction execution unit 110, floating point unit 112 and memory 116.

Generally speaking, instruction fetch unit 102 identifies groups of instructions within instruction cache 104, called instruction fetch bundles, for dispatch to decode unit 102. Instruction fetch unit 102 detects control-flow instructions within a fetch bundle and predicts the addresses of the instructions subsequent in program order to the control-flow instructions. Instruction fetch unit 102 predicts the next instruction fetch bundle based on this prediction. By predicting the outcome and target address of control-flow instructions, the instruction fetch unit attempts to keep the instruction processing pipeline filled with instructions in the correct program order.

When a control-flow instruction is executed by instruction execution unit 110, the predicted outcome and/or predicted branch target address of the control-flow instruction is compared to the actual outcome and/or actual branch target address determined by instruction execution unit 110. If the predictions were correct, instruction execution continues with the instructions in the instruction execution pipeline. If, however, a misprediction is detected, a misprediction signal is asserted that flushes the instructions subsequent in program order to the mispredicted control-flow instruction within the instruction processing pipeline. Instructions are then fetched from instruction cache 104 beginning at the actual branch target address. In one embodiment, the comparison of the actual branch outcome and the predicted branch outcome and/or the actual branch target address and the predicted branch target address is performed by instruction fetch unit 102. In an alternative embodiment, comparisons are performed by instruction execution unit 110 and the results of the comparisons are conveyed to instruction fetch unit 102.

Instruction cache 104 is a high-speed cache memory for storing instructions. Instruction cache 104 stores commonly or recently accessed blocks of data. It is noted that instruction cache 104 may be configured with any associativity, e.g., set associative or direct map configuration.

Decode unit 106 decodes each instruction fetched from instruction cache 104. Decode unit 106 dispatches an instruction to either instruction execution unit 110 or floating point unit 112 depending upon the type of instruction detected. Floating point instructions are dispatched to floating point unit 112 and integer instructions are dispatched to instruction execution unit 110. The decoded instructions comprise control signals used by instruction execution unit 110 or floating point unit 112 to execute the instruction. Decode unit 106 additionally detects register operands used by the instruction and reads these operands from register file 108.

In one embodiment, instruction execution unit 110 includes a plurality of execution units. In one particular embodiment, each execution unit is configured to execute the same subset of the instructions as the other execution units. In another embodiment, each execution unit is asymmetrical and configured to execute dissimilar subsets of the instruction set. For example, instruction execution unit 110 may include a branch execution unit for executing branch instructions and one or more arithmetic logic units for executing arithmetic and logical instructions. In a similar manner, floating point unit 112 may include a plurality of floating point units. The floating point units may be either symmetrical or asymmetrical. For example, asymmetrical floating point units may include an add/subtract floating point unit and a multiplication floating point unit.

Instruction execution unit 110 and floating point unit 112 additionally interface to data cache 114 for reading and storing operands to memory 116. Instructions may include both register operands and memory operands. When an integer or floating point instruction encounters a source memory operand, the address of the memory operand is provided to data cache 114. If the memory operand is stored within data cache 114, the data is passed to instruction execution unit 110 or floating point unit 112. If the memory operand is not stored within data cache 114, data cache 114 loads the cache line that includes the memory operand from memory 116 and passes the data to either instruction execution unit 110 or floating point unit 112. In one embodiment, instruction results are written to data cache 114 and main memory 116 to maintain cache coherency.

Register file 108 includes storage locations for each register defined by the microprocessor architecture employed by microprocessor 100. Additionally, register file 108 may include other nonarchitectural registers such as temporary registers.

Data cache 114 is a high speed memory configured to store data to be operated on by microprocessor 100. It is noted that data cache 114 may be configured with any associativity, e.g., set associative or direct-mapped.

Microprocessor 100 may include a cache hierarchy. For example, microprocessor 100 may include a third cache (not shown) coupled between instruction cache 104 and memory 116. In one embodiment, the third cache, or level-two cache, is larger and slower than instruction cache 104, but smaller and faster than memory 116. The level-two cache operates as an intermediate cache for storing instruction data. If an instruction fetch misses instruction cache 104, the desired cache line may reside in the level-two cache. In this embodiment, the penalty for missing cache 104 is reduced because the level-two cache has a faster access time than memory 116. The larger size of the level-two cache decreases the probability of missing both instruction cache 104 and the level-two cache.

Figure 2:
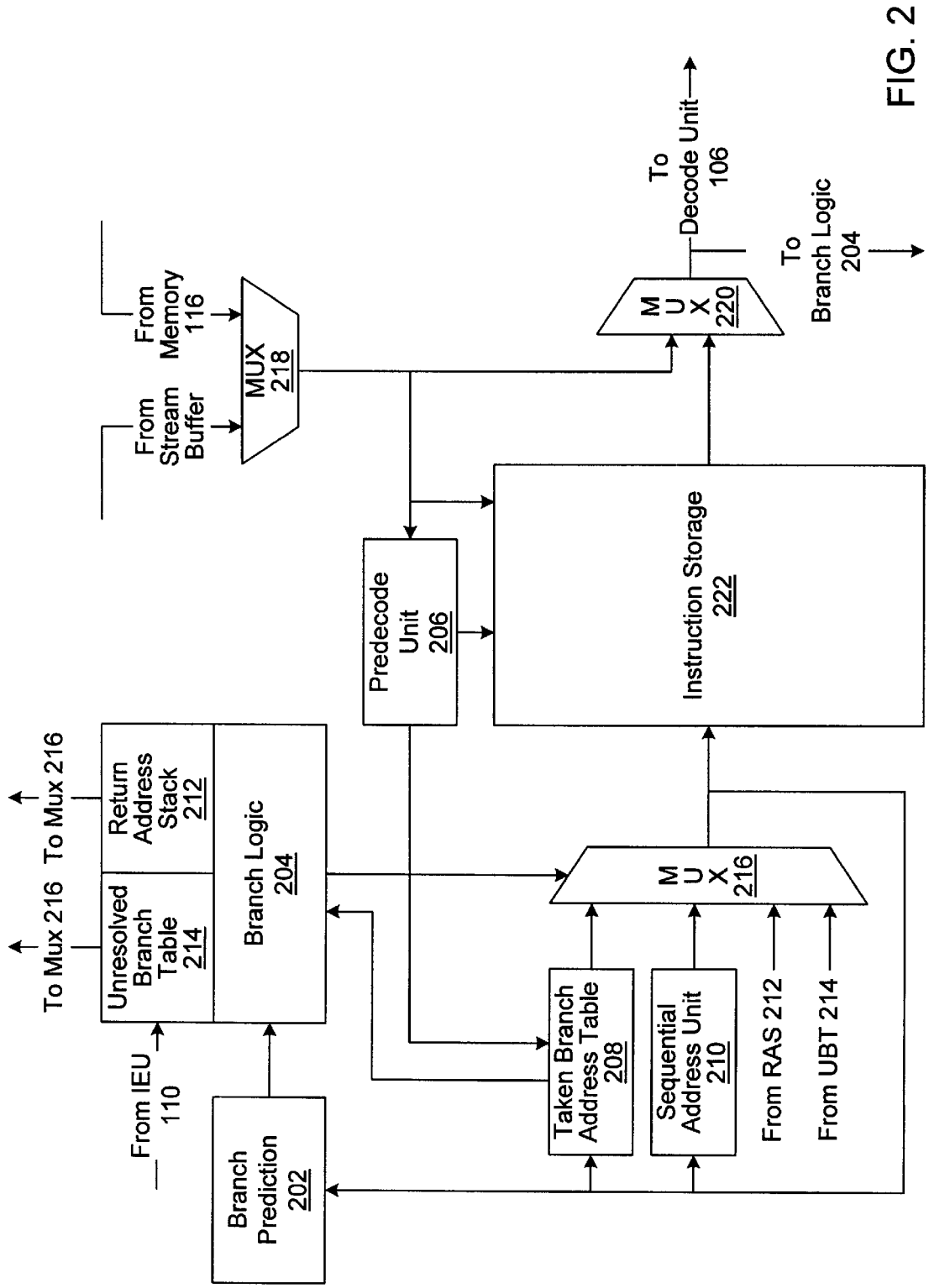
FIG. 2 is a block diagram of an instruction fetch unit and an instruction cache in accordance with one embodiment of the present invention.

Turning now to FIG. 2, a block diagram illustrating instruction fetch unit 102 and instruction cache 104 according to one embodiment of the present invention is shown. Instruction fetch unit 102 includes a branch predictor 202, branch logic 204, a taken branch address table (TBAT) 208, a sequential address unit 210, a return address stack (RAS) 212, an unresolved branch table (UBT) 214, and a multiplexer 216. Instruction cache 104 includes an instruction storage device 222, a predecode unit 206, a multiplexer 218 and a multiplexer 220. Branch predictor 202 is coupled to branch logic 204, which is further coupled to a control input of multiplexer 216, an output of multiplexer 220, TBAT 208, RAS 212 and UBT 214. TBAT 208 is coupled to predecode unit 206, branch logic 204, an input of multiplexer 216 and an output of multiplexer 216. Sequential address unit 210 is coupled to an output of multiplexer 216 and an input of multiplexer 216. Return address stack 212 is coupled to an input of multiplexer 216. UBT 214 is coupled to an input of multiplexer 216 and instruction execution unit 110. Instruction storage 222 is coupled to an output of multiplexer 216, an output of multiplexer 218, an input of multiplexer 220 and an output of predecode unit 206. The inputs of multiplexer 218 are coupled to a stream buffer and a memory 116. The output of multiplexer 218 is coupled to predecode unit 206, instruction storage 222 and multiplexer 220. The output of multiplexer 220 is coupled to decode unit 106 and branch logic 204.

Generally speaking, instruction fetch unit 102 uses the current fetch bundle address (the output of multiplexer 216) to predict the address of the next fetch bundle in program order. Each instruction fetch cycle, instruction cache 104 conveys a group of instructions to decode unit 106. This group of instructions is referred to as a fetch bundle. The number of instructions in a fetch bundle is implementation dependent and is partially dependent upon the number of execution units in instruction execution unit 110 and floating point unit 112. For example, a microprocessor with a total of eight execution units (both integer and floating point) may include eight instructions in a fetch bundle. In other embodiments, the number of instructions in a fetch bundle may differ from the number of execution units and floating point units.

Multiplexer 216 outputs the current fetch bundle address to instruction storage 222 of instruction cache 104. If the fetch bundle addresses identifies a fetch bundle stored in instruction storage 222, the fetch bundle is passed to decode unit 106 through multiplexer 220. If the fetch bundle address identifies a fetch bundle not stored in instruction storage 222, then a cache miss has occurred. In one embodiment, when a cache miss is detected, a block of memory data that includes the desired fetch bundle is loaded from memory 106 to instruction storage 222 via multiplexer 218.

In the illustrated embodiment, the data loaded from memory may also be conveyed to decode unit 106 via multiplexers 218 and 220. In the illustrated embodiment, data may also be conveyed from a stream buffer to instruction storage 222 and/or decode unit 106. The stream buffer is a device that prefetches data from a higher level of the cache hierarchy, e.g., the level-two cache. When a cache miss occurs, the stream buffer fetches instructions sequential to the address of the missed instruction.

As data is stored to instruction storage 222, predecode unit 206 generates a plurality of predecode bits, referred to as a predecode tag, that classify each instruction. In one embodiment, the predecode tag of each instruction identifies whether that instruction is a control-flow instruction or not a control-flow instruction. Additionally, the predecode tag may identify which of a plurality of types of control-flow instructions the associated instruction represents. For example, the predecode tag may identify whether an instruction is an unconditional branch instruction, a conditional branch instruction, a call instruction, or a return instruction. In other embodiments, the predecode tag may identify other characteristics of an instruction. For example, the predecode tag may identify whether the instruction is an integer or floating point instruction. In the illustrated embodiment, the predecode tag for each instruction is stored in instruction storage 222 and TBAT 208.

Multiplexer 216 selects the next fetch bundle address to provide the instruction storage 222 from a plurality of input sources. The UBT stores information to detect and recover from mispredicted control-flow instructions. In one embodiment, UBT 214 compares actual branch target addresses to predicted branch target addresses of previously dispatched and unresolved branch instructions. If a branch misprediction is detected, UBT 214 outputs the corrected branch target address. Multiplexer 216 selects the corrected branch target address output by UBT 214 when a branch misprediction is detected. UBT 214 is discussed in more detail below with reference to FIG. 4.

Return address stack (RAS) 212 is a storage device that stores return addresses for call instructions. A call instruction is an unconditional control-flow instruction that causes instruction execution to continue at the address specified by the call instruction. When a return instruction is executed subsequent to a call instruction, instruction execution continues at the instruction following the call instruction. When a call instruction is executed, the address of the instruction that follows the call instruction is stored on return address stack 212. Return address stack 212 outputs the return address on the top of the stack to multiplexer 216. If a return instruction is detected, multiplexer 216 selects the return address from RAS 212 as the next fetch bundle address. Additionally, the return address is popped from RAS 212 such that the next return address is available for the next return instruction.

Sequential address unit 210 generates the fetch address of the next sequential fetch bundle. The next sequential fetch bundle is the fetch bundle that follows the current fetch bundle in sequential order. In one embodiment, a sequential address, or sequential fetch address, is generated by adding the fixed length of the fetch bundle to the current fetch bundle address. For example, if each fetch bundle includes eight four-byte instructions and instructions are byte addressable, sequential address unit 210 receives the current fetch bundle address and adds thirty-two to it. The sequential address from sequential address unit 210 is selected by multiplexer 216 when no unconditional control-flow instructions and no taken conditional control-flow instructions are detected in the current fetch bundle.

Taken branch address table (TBAT) 208 stores a plurality of predicted branch target addresses. TBAT 208 is an example of a branch address table. TBAT 208 includes at least one predicted branch target address per instruction line. TBAT 208 includes an entry for each line within instruction cache 222. In one embodiment, the predecode tags for each fetch bundle are also stored in TBAT 208. TBAT 208 may store a plurality of predicted branch target addresses per fetch bundle. For example, TBAT 208 may store two addresses per fetch bundle. In one particular embodiment, if the first taken control-flow instruction is in the first half of the fetch bundle, the first predicted branch target address for the current fetch bundle is selected. Alternatively, if the first taken control-flow instruction is in the second half of the fetch bundle, the second predicted branch target address for the current fetch bundle is selected. In other embodiments, additional predicted branch target addresses may be stored for each fetch bundle address. Increasing the number of predicted branch target addresses per fetch bundle address may increase the accuracy of the predicted branch address. TBAT 208 is discussed in more detail below in reference to FIG. 3.

Branch logic 204 controls the selection of addresses by multiplexer 216. Generally speaking, branch logic 204 receives predecode tags identifying control-flow instructions and prediction data from branch predictor 202. Branch logic 204 detects the first taken control-flow instruction and selects the appropriate address from the available inputs to multiplexer 216 for the detected control-flow instruction.

The current fetch bundle address identifies the predecode tags of the current fetch bundle within TBAT 208. As noted above, TBAT 208 includes an entry for each fetch bundle within instruction storage 222 and the predecode tags generated by predecode unit 206 are stored in the appropriate entry as the instruction data is stored to instruction storage 222. The predecode tags of the current fetch bundle are output to branch logic 204.

Branch logic 204 uses the predecode tags to identify the control-flow instructions within the fetch bundle. The control-flow instructions may include unconditional control-flow instructions such as a call instruction, a return instruction or a jump instruction, and conditional control-flow instructions, or conditional branch instructions, such as branch on zero and branch on carry. Branch logic 204 also receives branch prediction data from branch predictor 202. The branch prediction data identifies whether conditional control-flow instructions are predicted taken or not taken. If a conditional control-flow instruction is predicted not taken, instruction execution continues at the instruction address subsequent to the address of the conditional control-flow instruction. If a conditional control-flow instruction is taken, instruction execution continues at the branch target address specified by the control-flow instruction. For the purposes of this disclosure, a branch target address is an address specified by a control-flow instruction to begin execution. In the case of a conditional control-flow instruction, the branch target address is used if the instruction condition is true. In one embodiment, the branch target address is specified by an offset from the current instruction address. In an alternative embodiment, the branch target address may be specified by a memory address.

Branch predictor 202 receives the current fetch bundle address and uses the address to predict the outcome of conditional control-flow instructions. Branch predictor 202 may output a single branch prediction for a fetch bundle or may output a plurality of branch predictions for a fetch bundle. For example, branch predictor 202 may output eight branch predictions per fetch bundle. If a fetch bundle includes eight instructions, one branch prediction applies to each instruction within a fetch bundle. Branch predictor 202 may implement any conventional branch prediction algorithm. For example, branch predictor 202 may store one bit identifying whether the last iteration of the branch was taken or not taken and predict the same outcome. Alternatively, a two-bit saturating counter may be used for each branch prediction. A saturating counter is a counter that does not rollover. When the maximum count reached, the counter maintains the maximum count until the counter is decremented. Similarly, when the minimum count is reached, the counter maintains the minimum count until the counter is incremented. Each time a branch is taken, the saturating counter is incremented and each time the branch is not taken the saturating counter is decremented. The most significant bit of the counter identifies whether to predict the next iteration of the branch as taken or not taken. The saturating counter adds hysteresis to the prediction such that multiple not taken branches must occur prior to predicting a branch not taken when the saturating counter is in a strongly taken state.

Branch logic 204 uses the predecode data and the branch prediction data to identify the first taken control-flow instruction. A taken control-flow instruction is either an unconditional control-flow instruction or a conditional control-flow instruction predicted taken by branch predictor 202. Branch logic 204 identifies the type of the first taken control-flow instruction and outputs control signals to multiplexer 216 that causes multiplexer 216 to select the appropriate address input as the next fetch bundle address based upon that type. For example, if the first taken control-flow instruction is a return instruction, branch logic 204 causes multiplexer 216 to select the output of return stack 212. If the first taken control-flow instruction is an unconditional branch instruction or a conditional branch instruction predicted taken, branch logic 204 causes multiplexer 216 to select an output of TBAT 208 as the next fetch bundle address.

In one embodiment, branch logic 204 is coupled to receive the fetch bundle output from instruction storage 222. Branch logic 204 may use the fetch bundle to obtain further information about the types of instructions within the fetch bundle. For example, in one embodiment, the predecode array only identifies branch instructions. The predecode array does not identify the type of branch instruction. Branch logic 204 may determine if the fetch bundle includes a specific type of branch instruction, such as a call instruction, by further decoding the fetch bundle. If a call instruction is detected, a return address is pushed on RAS 212.

If branch logic 204 does not identify a taken control-flow instruction, branch logic 204 causes multiplexer 216 to select the output of sequence address unit 210 as the next fetch bundle address. No taken control-flow instructions will be detected if a fetch bundle contains either no control-flow instructions or the fetch bundle contains only conditional branch instructions that are predicted not taken by branch predictor 202.

If a mispredicted control-flow instruction is detected, branch logic 204 causes multiplexer 216 to select the output of UBT 214 as the next fetch bundle address. In one embodiment, UBT 214 detects a mispredicted conditional branch instruction by comparing the actual branch target address generated by instruction execution unit 110 to the predicted branch target address stored in UBT 214. UBT 214 asserts a signal to branch logic 204 indicating that a mispredicted branch has been detected. Branch logic 204 in turn asserts a control signal to multiplexer 216 that causes multiplexer 216 to select the output of UBT 214. In an alternative embodiment, the predicted branch target address is passed to decode unit 106 as a parameter with a control-flow instruction and instruction execution unit 110 compares the actual branch target address to the predicted branch target address. In this embodiment, instruction execution unit 110 asserts a signal to UBT 214 indicating that a mispredicted branch instruction has occurred. UBT 214 is discussed in more detail below in reference to FIG. 4.

Figure 3:
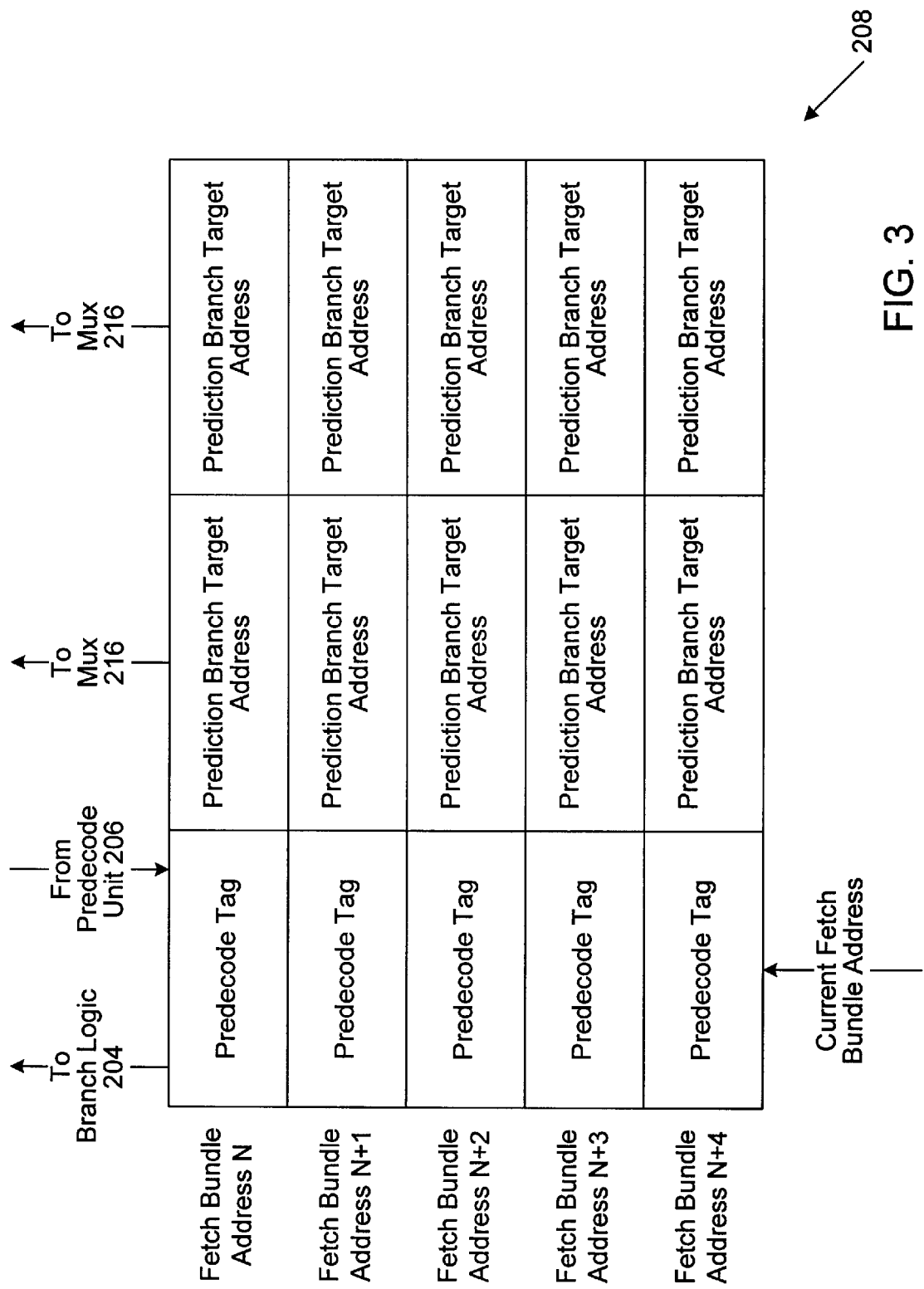
FIG. 3 is a block diagram of a taken branch address table in accordance with one embodiment of the present invention.

Turning now to FIG. 3, a block diagram of TBAT 208 according to one embodiment of the present invention is shown. In one embodiment, the entries in TBAT 208 have a one-to-one correspondence to the lines in instruction cache 104. For example, TBAT 208 may include one entry for each line within instruction cache 104. In the illustrated embodiment, TBAT 208 includes five entries: fetch bundle address N through fetch bundle address N+4. The number of entries in TBAT 208 as shown in FIG. 3 is for illustration purposes only. A typical TBAT 208 will include more than five entries. Each entry of TBAT 208 includes a predecode tag field and one or more predicted branch target address fields. In the illustrated embodiment, TBAT 208 includes two predicted branch target address fields. In other embodiments, TBAT 208 may have as few as one predicted branch target address and as many branch target addresses as instructions in a fetch bundle.

As discussed above, TBAT 208 stores predecode tag data received from predecode unit 206. In one embodiment, the predecode tag data stored in TBAT 208 is redundant with the predecode tag data stored in instruction storage 222. The predecode tag data is stored in TBAT 208 to expedite access to the predecode data. The latency to access the predecode data within instruction storage 222 may be too long to allow branch logic 204 to select the next fetch bundle address based upon the predecode data. Therefore, the predecode data is stored in the relatively small and fast TBAT 208.

TBAT 208 receives the current fetch bundle address from multiplexer 216. The current fetch bundle address identifies which entry within TBAT 208 to access. TBAT 208 outputs the predecode tag data stored at the entry addressed by the current fetch bundle address to branch logic 204. As discussed above, branch logic 204 uses the predecode tag data and branch prediction data to identify the first taken control-flow instruction within the current fetch bundle.

The current fetch bundle address additionally identifies the one or more predicted branch target addresses for the current fetch bundle. In the illustrated embodiment each entry includes two predicted branch target addresses. Each predicted branch target address is output to multiplexer 216. In one particular embodiment, branch logic 204 causes multiplexer 206 to select the first predicted branch target address if the first taken branch instruction is in the first half of the current fetch bundle. Likewise, branch logic 204 causes multiplexer 216 to select the second predicted branch target address if the first predicted taken branch instruction is in the second half of the current fetch bundle address. In alternative embodiments, TBAT 208 may include more predicted branch target addresses per entry. For example, TBAT 208 may include four predicted branch target addresses per entry. In this embodiment, the first predicted branch target address is selected if the first taken branch instruction is in the first quarter of the current fetch bundle. In a similar manner, the second predicted branch target address is selected if the first predicted taken branch instruction is in the second quarter, the third predicted branch target address is selected if the first predicted taken branch instruction is in the third quarter, and the last predicted branch target address is selected if the first predicted taken branch instruction is in the last quarter of the fetch bundle.

Any conventional method may be used to predict the branch target addresses. For example, the predicted branch target address may be the last actual branch target address for a branch instruction in the fetch bundle associated with an entry of TBAT 208. In other embodiments, more complex branch target address prediction algorithms may be implemented. If multiple predicted branch target addresses are stored for each entry, the prediction of each branch target address may be dependent upon a portion of the fetch bundle in which branch instruction is found. For example, the first predicted branch target address in the illustrated embodiment may be used for branch instructions located in the first half of the fetch bundle and the second predicted branch target address may be used for instructions located in the second half of the fetch bundle.

Figure 4:
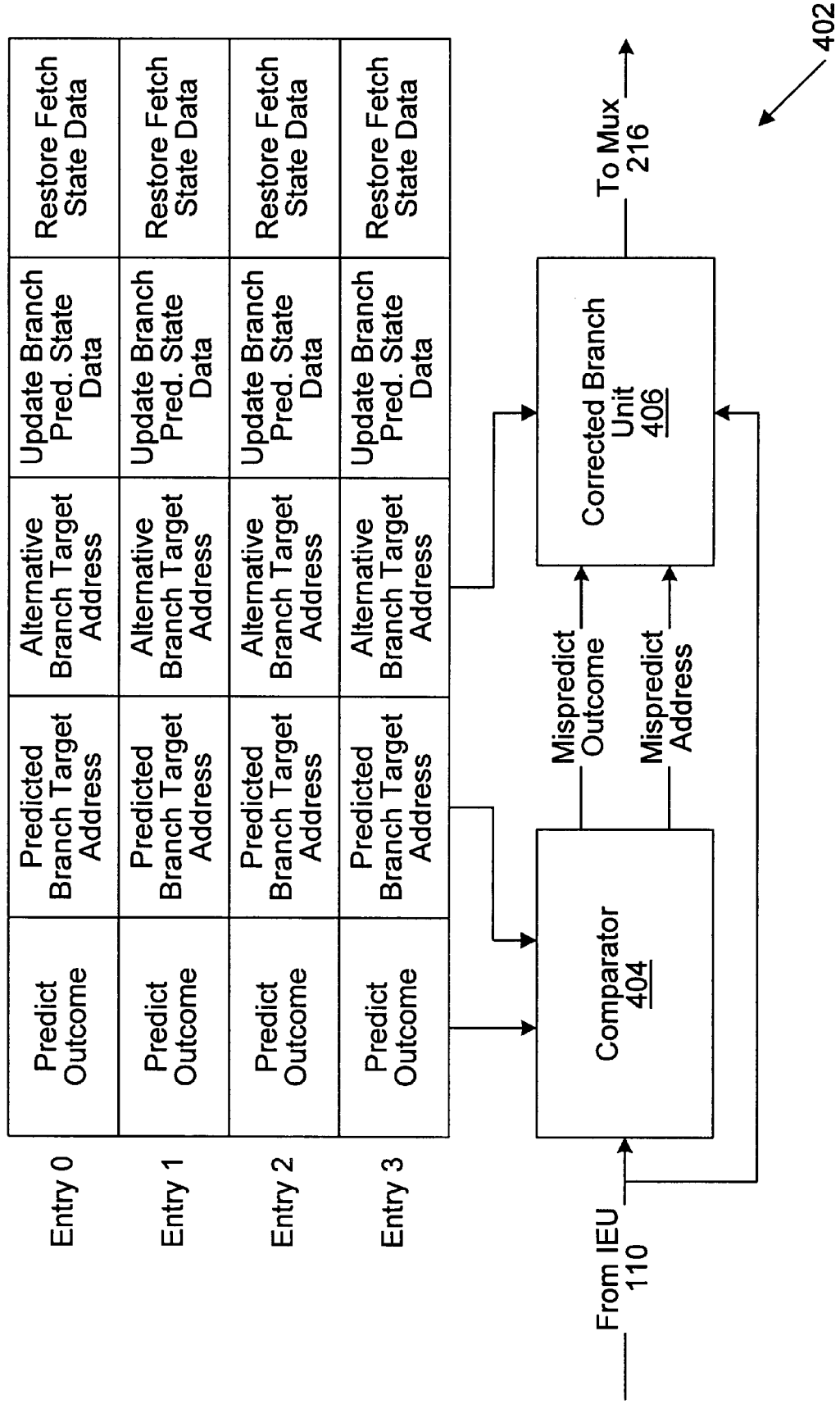
FIG. 4 is a block diagram of an unresolved branch table in accordance with one embodiment in the present invention.

Turning now to FIG. 4, a block diagram of UBT 214 is shown. UBT 214 includes storage device 402, comparator 404 and corrected branch unit 406. Storage device 402 stores information to detect and recover from a mispredicted control-flow instruction. Comparator 404 compares the actual outcome and/or actual branch target address to the predicted outcome and/or the predicted branch target address.

Storage device 402 includes a plurality of entries. Each entry stores information to detect and recover from a mispredicted control-flow instruction. Each control-flow instruction predicted to execute (i.e. within the stream of instructions dispatched to a decode unit) within a fetch bundle is allocated an entry in storage device 402. Each entry in storage device 402 stores data to detect and recover from a mispredicted branch instruction. In the illustrated embodiment, each entry stores the predicted branch outcome, the predicted branch target address, an alternative branch target address, information to update the branch predictor state and information to restore the instruction fetch state. The predicted branch outcome and the information to update the branch predictor state is only stored for conditional branches. The data stored in storage device 402 is for illustration purposes only. The data required to detect and recover from a mispredicted branch will vary from between implementations.

The predicted outcome indicates whether a conditional branch instruction was predicted taken or not taken at the time of instruction fetch. In one embodiment, the predicted outcome is the branch prediction data received from branch predictor 202 for an instruction. The predicted branch target address stores the branch target address of unconditional branches or predicted taken conditional branches at the time of instruction fetch. In one embodiment, the predicted branch target address is the address selected by multiplexer 216. The alternative branch target address stores an alternative address if a branch is incorrectly predicted. For example, if a branch instruction is predicted taken, the alternative branch address may be the address of the instruction following the conditional branch instruction. Alternatively, if a branch address is predicted not taken, the alternative branch address may store the predicted branch target address from TBAT 208. The update branch prediction state field stores information to update the branch prediction state. The restore fetch state field stores information to restore the state of instruction fetch unit 102 to the state prior to the branch misprediction. For example, the restore state field may store the stack pointer of RAS 212 and the state of the branch history register of branch predictor 202.

In one embodiment, a misprediction may be detected by comparing the predicted branch outcome to the actual branch outcome. In this embodiment, the branch target address is known during prefetch. Accordingly, when a branch misprediction is detected, instruction fetch and execution may begin at the alternative branch address. In another embodiment, the branch target address is not known at the time of instruction fetch. The branch target address is predicted by instruction fetch unit 102. In this embodiment, even if a branch prediction is correct, the predicted branch target address may be incorrect. Accordingly, to detect a branch misprediction the actual branch target address is compared to the predicted branch target address and the predicted outcome is compared to the actual outcome. If either a branch misprediction or a branch target misprediction is detected, the instruction fetch mechanism flushes the instructions in the execution pipeline and begins execution at the correct address. Recovery, however, may be different for a mispredicted branch and a mispredicted branch target address. For example, if a branch outcome misprediction is detected, the state of branch predictor 202 may be updated. If a mispredicted branch target address is detected, TBAT 208 may be updated, or both branch predictor 202 and TBAT 208 may be updated.

In the illustrated embodiment, comparator 404 compares both the actual branch outcome to the predicted branch outcome and the actual branch target address to the predicted branch target address. Comparator 404 indicates to corrected branch unit 406 whether a misprediction has occurred and whether the misprediction is a mispredicted branch outcome or a mispredicted branch target address. In one embodiment, corrected branch unit 406 determines the corrected branch target address from the actual branch address received from instruction execution unit 110 and the alternative branch address of storage 402. For example, if a mispredicted branch target address is detected, corrected branch unit may output the actual branch address to multiplexer 216. Alternatively, if a conditional branch instruction was incorrectly predicted as taken, corrected branch unit 406 may output the alternative branch address stored in storage 402. In the latter case, the alternative branch address is the address of the instruction following the conditional branch instruction.

In one embodiment, storage device 402 is organized as a first-in first-out (FIFO) device. In this embodiment, instruction results from instruction execution unit 110 are compared to the least recently stored entry of storage device 402. When an entry is compared to the instruction result information, the entry is invalidated or deleted from UBT 214. If a branch misprediction is detected, storage device 402 is flushed and new unresolved branch information is stored in storage device 402 as branch instructions are dispatched using the correct instruction fetch address.

Figure 5:
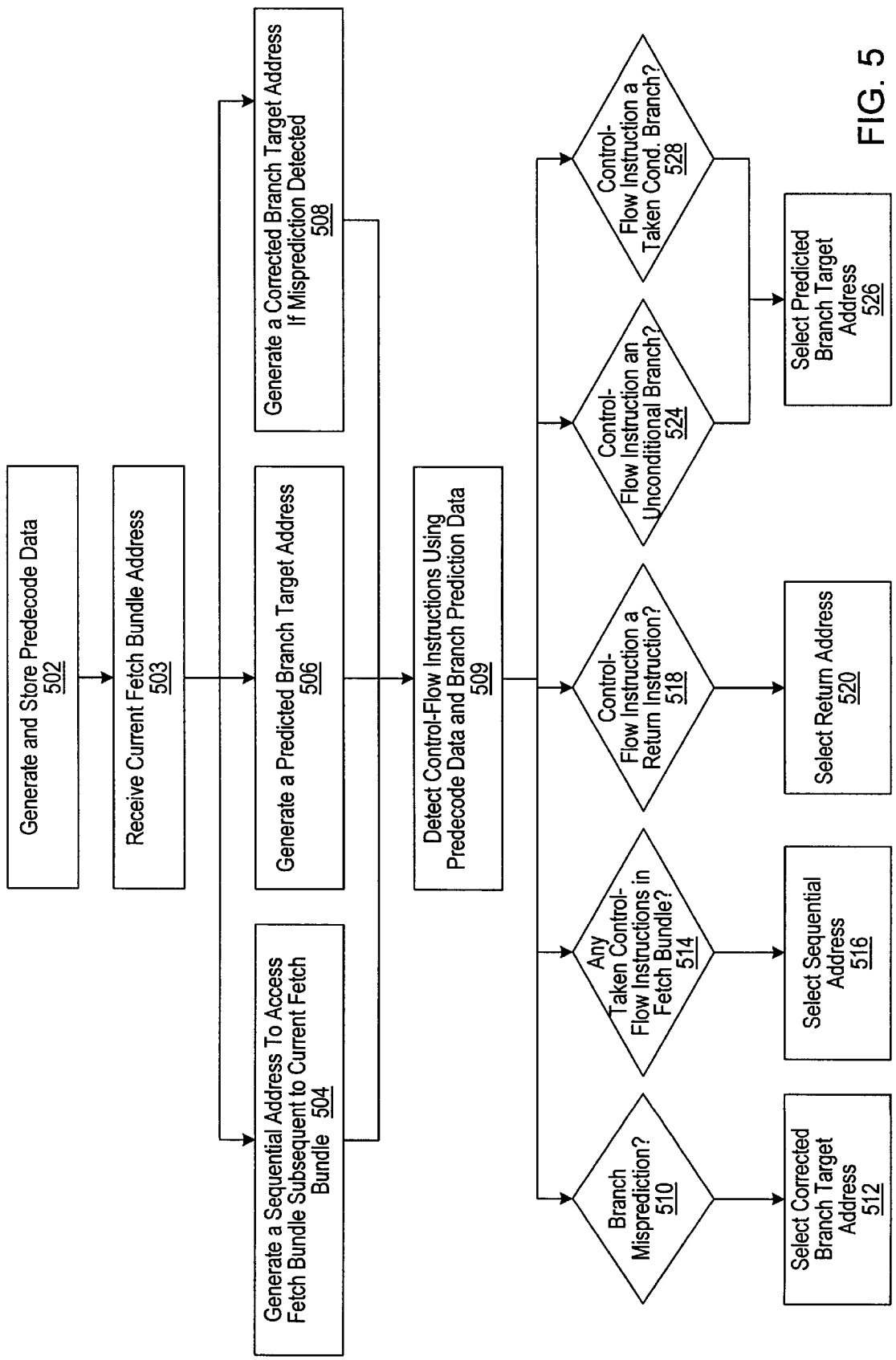
FIG. 5 is a flow chart diagram illustrating the operation of an instruction fetch unit in accordance with one embodiment of the present invention.

Turning now to FIG. 5, a flow chart diagram illustrating the operation of one embodiment of an instruction fetch unit in accordance with the present invention is shown. In step 502, predecode data is generated for instruction data stored in an instruction cache. In one embodiment, the predecode data is also stored in a fast easily accessible storage device such as TBAT 208. In step 503, the address of the current fetch bundle is received. In one embodiment steps 504, 506 and 508 are performed in parallel. In step 504, a sequential fetch bundle address is generated to access a fetch bundle subsequent to the current fetch bundle. In step 506, a predicted branch target address is generated. Any conventional method for predicting branch target addresses may be implemented. In step 508 a corrected branch target address is generated if a misprediction is detected. A corrected branch target address may be determined from an actual branch target address calculated by an instruction execution unit or data stored at the time of instruction fetch and dispatch.

In step 509, the occurrence control-flow instructions are detected using predecode data, and branch prediction data is used to predict whether any control-flow instructions are predicted taken or not taken. In one embodiment, a taken control-flow instruction is defined as an unconditional control-flow instruction such as a return instruction or a conditional control-flow instruction, such as a branch-on-zero instruction, that is predicted taken. In one embodiment, steps 510, 514, 518, 524 and 528 are performed in parallel. In step 510, it is determined whether a branch misprediction occurred in an instruction execution cycle. In one embodiment, a branch misprediction occurs when either a branch is mispredicted as taken or not taken or a branch target address is mispredicted. If a branch misprediction is detected in step 510, then in step 512 the corrected branch target address generated in step 508 is selected as the next fetch bundle address. In step 514 it is determined whether any taken control-flow instructions are included in the fetch bundle. If no taken control-flow instructions are detected in the fetch bundle, then in step 516 the sequential address generated in step 504 is selected as the next fetch bundle address. In step 518, it is determined whether the first taken control-flow instruction is a return instruction. If in step 518, it is determined the first taken control-flow instruction is a return instruction, then in step 520 a return address is selected as the next fetch bundle address. In one embodiment, the return address is stored on a return address stack. Return addresses are pushed on the stack as call instructions are executed. In step 524, it is determined whether the first control-flow instruction is an unconditional branch instruction. If the first control-flow instruction is an unconditional branch, then in step 526 the predicted branch target address generated in step 506 is selected as the next fetch bundle address. In step 528 it is determined whether the first taken control-flow instruction is a conditional branch instruction that is predicted taken. If the first control-flow instruction is a taken conditional branch instruction, then in step 526 the predicted branch target address generated in step 506 is selected as the next fetch bundle address.

Numerous variations and modifications will become apparent to those skilled in the art once the above disclosure is fully appreciated. It is intended that the following claims be interpreted to embrace all such variations and modifications.

What is claimed is:

1. An instruction fetch unit that concurrently makes multiple predictions for different types of control-flow instructions comprising:

a branch address table configured to store predicted branch target addresses for branch instructions and to output a predicted branch target address signal;

a sequential address circuit configured to calculate a sequential address and to output a sequential fetch address signal;

an unresolved branch circuit configured to store a corrected branch target address for a mispredicted branch instruction and to output a corrected branch target address signal;

a multiplexer coupled to receive a plurality of input signals including said predicted branch target address signal, said sequential fetch address signal and said corrected branch target address signal, and configured to output a current fetch bundle address signal that addresses a fetch bundle;

a branch logic circuit coupled to provide a control signal to said multiplexer, wherein said branch logic circuit is configured to cause said multiplexer to select one of said plurality of input signals in dependence on an occurrence of a control-flow instruction within said fetch bundle or an occurrence of a mispredicted branch instruction; and a predecode circuit configured to generate an array of predecode bits that identifies a type of instructions within said fetch bundle, wherein said branch logic circuit is configured to use said array of predecode bits to identify an occurrence and location of control-flow instructions.

2. The instruction fetch unit of claim 1 wherein said branch logic circuit is configured to cause said multiplexer to select said predicted branch target address signal if said fetch bundle includes an unconditional branch instruction or a taken conditional branch instruction.

3. The instruction fetch unit of claim 2 further comprising a branch predictor coupled between said current fetch bundle address signal and said branch logic circuit, wherein said branch predictor is configured to predict whether conditional branches within said fetch bundle are taken or not taken.

4. The instruction fetch unit of claim 3 wherein said sequential address is an address of a fetch bundle sequential in numerical order to said fetch bundle, and said branch logic circuit is configured to cause said multiplexer to select said sequential fetch address signal when said fetch bundle does not include a taken control-flow instruction.

5. The instruction fetch unit of claim 4 wherein said branch logic circuit is configured to cause said multiplexer to select said corrected branch target address signal if a mispredicted branch is detected.

6. The instruction fetch unit of claim 5 wherein said branch address table is configured to output two predicted branch target address signals to said multiplexer for each fetch bundle, and said branch logic circuit is configured to cause said multiplexer to select one of said two predicted branch target address signals in dependence on a location of a first unconditional branch instruction or taken conditional branch instruction within said fetch bundle.

7. The instruction fetch unit of claim 1 further comprising a return address unit configured to store a return address for a call instruction and configured to output a return address signal which is coupled to said multiplexer, wherein said branch logic circuit is configured to cause said multiplexer to select said return address signal if said fetch bundle includes a return instruction.

8. The instruction fetch unit of claim 7 wherein said return address unit is a stack device configured to store a plurality of return addresses and said return address unit is configured to output a most recently stored return address as said return address signal.

9. The instruction fetch unit of claim 3 wherein said branch logic circuit is configured to use said array of predecode bits and an output of said branch predictor to identify a first taken control-flow instruction.

10. An instruction fetch unit that concurrently makes multiple predictions for different types of branches comprising:

a branch address table configured to store predicted branch target addresses for branch instructions and to output a predicted branch target address signal;

a sequential address circuit configured to calculate a sequential address and to output a sequential fetch address signal;

a return address unit configured to store a return address for a call instruction and configured to output a return address signal;

a branch misprediction recovery circuit configured to store a corrected branch target address for a mispredicted branch instruction and to output a corrected branch target address signal;

a multiplexer coupled to receive a plurality of input signals including said predicted branch target address signal, said sequential fetch address signal, said return address signal and said corrected branch target address signal, and configured to output a fetch bundle address signal that addresses a fetch bundle;

a branch predictor coupled to said fetch bundle address signal and said branch logic circuit, wherein said branch predictor predicts whether conditional branches within said fetch bundle are taken or not taken a branch logic circuit coupled to a control signal of said multiplexer, wherein said branch logic circuit is configured to cause said multiplexer to select one of said plurality of input signals in dependence on the occurrence of a control-flow instruction within said fetch bundle or the occurrence of a mispredicted branch instruction;

a predecode circuit configured to generate an array of predecode bits that identifies a type of instructions with said fetch bundle, wherein said branch logic circuit is configured to use said array of predecode bits to identify the occurrence and location of branch instructions.

11. An instruction fetch unit that concurrently makes multiple predictions for different types of control-flow instructions comprising:

a branch address table configured to store predicted branch target addresses for branch instructions and to output two predicted branch target address signals;

a sequential address circuit configured to calculate a sequential address and to output a sequential fetch address signal;

an unresolved branch circuit configured to store a corrected branch target address for a mispredicted branch instruction and to output a corrected branch target address signal;

a multiplexer coupled to receive a plurality of input signals including said predicted branch target address signal, said sequential fetch address signal and said corrected branch target address signal, and configured to output a current fetch bundle address signal that addresses a fetch bundle; and a branch logic circuit coupled to provide a control signal to said multiplexer, wherein said branch logic circuit is configured to cause said multiplexer to select one of said plurality of input signals in dependence on an occurrence of a control-flow instruction within said fetch bundle or an occurrence of a mispredicted branch instruction;

wherein said branch address table is configured to output said two predicted branch target address signals to said multiplexer for each fetch bundle, and said branch logic circuit is configured to cause said multiplexer to select one of said two predicted branch target address signals in dependence on a location of a first unconditional branch instruction or a first taken conditional branch instruction within said fetch bundle.

12. The instruction fetch unit of claim 11 further comprising a branch predictor coupled between said current fetch bundle address signal and said branch logic circuit, wherein said branch predictor is configured to predict whether conditional branches within said fetch bundle are taken or not taken.

13. The instruction fetch unit of claim 12 wherein said sequential address is an address of a fetch bundle sequential in numerical order to said fetch bundle, and said branch logic circuit is configured to cause said multiplexer to select said sequential fetch address signal when said fetch bundle does not include a taken control-flow instruction.

14. The instruction fetch unit of claim 13 wherein said branch logic circuit is configured to cause said multiplexer to select said corrected branch target address signal if a mispredicted branch is detected.

15. The instruction fetch unit of claim 11 further comprising a return address unit configured to store a return address for a call instruction and configured to output a return address signal which is coupled to said multiplexer, wherein said branch logic circuit is configured to cause said multiplexer to select said return address signal if said fetch bundle includes a return instruction.

16. The instruction fetch unit of claim 15 wherein said return address unit is a stack device configured to store a plurality of return addresses and said return address unit is configured to output a most recently stored return address as said return address signal.

17. The instruction fetch unit of claim 12 further comprising a predecode circuit configured to generate an array of predecode bits that identifies a type of instructions within said fetch bundle, wherein said branch logic circuit is configured to use said array of predecode bits to identify an occurrence and location of control-flow instructions.

18. The instruction fetch unit of claim 17 wherein said branch logic circuit is configured to use said array of predecode bits and an output of said branch predictor to identify a first taken control-flow instruction.

* * * * *